United States Patent
Ariga et al.

(10) Patent No.: US 11,659,264 B2
(45) Date of Patent: May 23, 2023

(54) PHOTOGRAPHING APPARATUS WITH MOBILE CARRIAGE AND PHOTOGRAPHING METHOD THEREFOR

(71) Applicant: TOSHIBA TEC KABUSHIKI KAISHA, Tokyo (JP)

(72) Inventors: Norimasa Ariga, Izunokuni Shizuoka (JP); Masaaki Yasunaga, Sunto Shizuoka (JP); Keita Yamazaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 17/103,816

(22) Filed: Nov. 24, 2020

(65) Prior Publication Data

US 2021/0303858 A1 Sep. 30, 2021

(30) Foreign Application Priority Data

Mar. 26, 2020 (JP) ............... JP2020-055432

(51) Int. Cl.
*H04N 23/56* (2023.01)
*H04N 23/57* (2023.01)
*H04N 23/62* (2023.01)

(52) U.S. Cl.
CPC ............ *H04N 23/56* (2023.01); *H04N 23/57* (2023.01); *H04N 23/62* (2023.01)

(58) Field of Classification Search
None
See application file for complete search history.

(56) References Cited

U.S. PATENT DOCUMENTS

| 11,041,709 | B1 * | 6/2021 | Zik | B23K 26/402 |
| 2010/0268372 | A1 * | 10/2010 | Zurbuchen | B29C 66/43 700/122 |
| 2018/0020145 | A1 * | 1/2018 | Kotfis | H04N 23/90 |
| 2020/0057012 | A1 * | 2/2020 | Engelbart | G01J 5/041 |
| 2020/0304553 | A1 * | 9/2020 | Luo | H04N 13/167 |
| 2021/0048829 | A1 * | 2/2021 | Deyle | G05D 1/0246 |
| 2021/0120185 | A1 * | 4/2021 | Etou | H04N 7/181 |

FOREIGN PATENT DOCUMENTS

JP 2012-053711 3/2012

* cited by examiner

*Primary Examiner* — Cynthia Segura
(74) *Attorney, Agent, or Firm* — Foley & Lardner LLP

(57) ABSTRACT

A photographing apparatus includes a carriage, a light source, and a camera. The carriage moves in a travel direction. The light source is mounted on the carriage. The camera is attached to the carriage and configured to perform photography. A normal direction is defined orthogonal to the travel direction and a vertical axis. The camera faces a camera direction that is rotated about the vertical axis with respect to the normal direction.

19 Claims, 10 Drawing Sheets

PHOTOGRAPHING APPARATUS WITH MOBILE CARRIAGE AND PHOTOGRAPHING METHOD THEREFOR

CROSS-REFERENCE TO RELATED APPLICATION

This application is based upon and claims the benefit of priority from Japanese Patent Application No. 2020-055432, filed on Mar. 26, 2020, the entire contents of which are incorporated herein by reference.

FIELD

Embodiments described herein relate generally to a photographing apparatus and a photographing method.

BACKGROUND

A store such as a supermarket uses, as a part of an energy saving strategy, an apparatus that photographs commodity shelves in the store with cameras and automatically checks whether price tags of the commodity shelves are correct.

The check of the price tags of the commodity shelves by this apparatus is performed in quiet hours when shoppers are absent in the store. In particular, from the viewpoint of automation, it is highly likely that the check of the price tags are automatically performed by going around the store at night. In photographing at night, it is likely that illumination in the store is not lit. The photographing needs to be performed by a set of the illumination and the cameras.

On the other hand, in most cases, the price tags of the commodity shelves are held by transparent resin and set at ends of the commodity shelves. The shoppers see the price tags through the transparent resin. Accordingly, in the photographing by the apparatus, it is likely that reflection of an illumination light source on the transparent resin occurs and the light source is reflected in the price tags of the commodity shelves. If the light source is reflected in the price tags in this way, a white void occurs in a photographed image. Price tag information printed on the price tags cannot be seen.

Related art is described in, for example, JP-A-2012-053711.

DETAILED DESCRIPTION

An object of embodiments is to provide a photographing apparatus and a photographing method with which an illumination light source is not reflected in a photographed image.

In one embodiment, a photographing apparatus includes a moving mechanism, a light source, and a camera. The moving mechanism moves in a first direction. The light source is mounted on the moving mechanism. The camera is disposed linearly or substantially linearly to the light source along a height direction and is attached to the moving mechanism to face a third direction rotated about an axis extending along the height direction with respect to a second direction orthogonal to the first direction and the height direction and performs photographing.

In one embodiment, a photographing method includes moving, in a first direction, a moving mechanism, to which a light source and a camera disposed linearly or substantially linearly along a height direction are attached such that the camera faces a third direction rotated about an axis extending along the height direction with respect to a second direction orthogonal to the first direction and the height direction and performs photographing, while maintaining a predetermined distance to one or more photographing target objects arranged side by side along the first direction. The photographing method further includes correcting distortion of an image photographed by the camera and acquiring a photographed image equivalent to a case in which the camera faces the second direction and performs the photographing.

Embodiments of a photographing apparatus with which an illumination light source is not reflected in a photographed image are explained below with reference to the drawings.

[First Embodiment]

Figure 1:
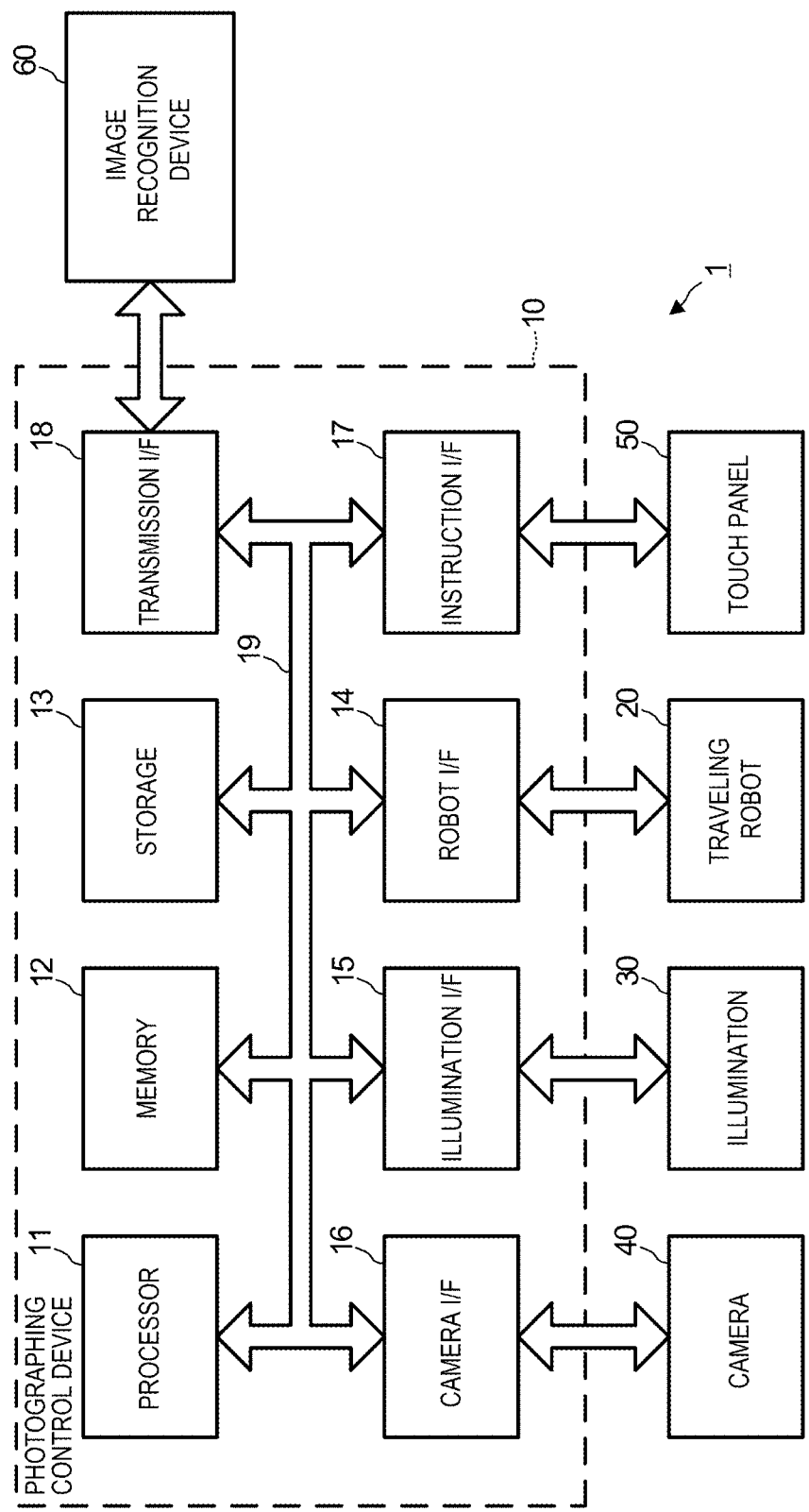
FIG. 1 is a block diagram illustrating a hardware configuration of a photographing apparatus in a first embodiment.

FIG. 1 is a block diagram illustrating a hardware configuration of a photographing apparatus 1 according to a first embodiment. The photographing apparatus 1 includes a photographing control device 10, a traveling robot 20, illumination 30, and a camera 40. The photographing apparatus 1 may further include a touch panel 50 and/or an image recognition device 60.

The photographing control device 10 controls units of the photographing apparatus 1. The traveling robot 20 autonomously travels along a predetermined route according to an instruction of the photographing control device 10. The illumination 30 includes a plurality of illumination light sources. The illumination light sources may be white light sources or may be infrared light sources. The camera 40 photographs a photographing target. The camera 40 is, for example, a digital camera in which a Charge Coupled Device (CCD) is used as an imaging element. If the illumination light sources are white light sources, the camera 40 may be a color camera or may be a monochrome camera. If the illumination light sources are infrared light sources, the camera 40 may be an infrared camera. A user of the photographing apparatus 1 inputs, to the touch panel 50, an instruction to the photographing control device 10. The touch panel 50 displays various kinds of information generated by the photographing apparatus 1. The image recognition device 60 recognizes the photographing target from photographed image data photographed by the camera 40.

The photographing control device 10 (e.g., a controller) includes a processor 11, a memory 12, a storage 13, a robot interface 14, an illumination interface 15, and a camera interface 16. The photographing control device 10 sometimes further includes an instruction interface 17 and/or a transmission interface 18. In FIG. 1, interface is abbreviated as I/F. The processor 11, the memory 12, the storage 13, the robot interface 14, the illumination interface 15, the camera interface 16, the instruction interface 17, and the transmission interface 18 are respectively connected to a system transmission path 19. The system transmission path 19 includes an address bus, a data bus, and a control signal line. In the photographing control device 10, the processor 11 and the memory 12 are connected by the system transmission path 19 to configure a computer that performs information processing for controlling the photographing control device 10.

The robot interface 14 is connected to the traveling robot 20. The illumination interface 15 is connected to the illumination 30. The camera interface 16 is connected to the camera 40. The instruction interface 17 is connected to the touch panel 50. The transmission interface 18 is connected to the image recognition device 60.

The processor 11 of the photographing control device 10 is equivalent to a central part of the computer. The processor 11 controls the units according to an operating system or application programs in order to realize various functions of the photographing control device 10. The processor 11 is, for example, a Central Processing Unit (CPU).

The memory 12 is equivalent to a main storage part of the computer. The memory 12 includes a nonvolatile memory region and a volatile memory region. The memory 12 stores the operating system or the application programs in the nonvolatile memory region. The memory 12 stores, in the volatile memory region, data necessary for the processor 11 to execute processing for controlling the units. The processor 11 uses the volatile memory region of the memory 12 as a work area where data is rewritten as appropriate. The nonvolatile memory region is, for example, a Read Only Memory (ROM). The volatile memory region is, for example, a Random Access Memory (RAM).

The storage 13 stores, in a nonvolatile manner, photographed image data photographed by the camera 40. As the storage 13, a well known storage device such as an Electric Erasable Programmable Read-Only Memory (EEPROM), a Hard Disc Drive (HDD), or an Solid State Drive (SSD) can be used alone or a plurality of thereof can be used in combination.

The robot interface 14 is an interface for the processor 11 to exchange data between the processor 11 and the traveling robot 20. The robot interface 14 includes a wireless communication unit for transmitting and receiving data through wireless communication such as a wireless Local Area Network (LAN) or Bluetooth (registered trademark). With the robot interface 14, the photographing control device 10 can be disposed in a control room or the like of the store and remotely control the traveling robot 20. The data transmitted from the processor 11 to the traveling robot 20 can include, for example, traveling instruction data for instructing traveling of the traveling robot 20. The traveling robot 20 stores a traveling route indicating where in the store the traveling robot 20 travels. The traveling instruction data is data for designating one of a plurality of traveling start points included in the traveling route. The traveling instruction data may include data for designating a stop point of the traveling. Data received by the processor 11 from the traveling robot 20 can include, for example, state data relating to the autonomous traveling of the traveling robot 20. The state data includes arrival data indicating that the traveling robot 20 reaches a stop point corresponding to a designated traveling start point or a designated stop point. The state data can include information data of a failure or the like.

The illumination interface 15 is an interface for transmitting, for example, illumination control data for instructing lighting and extinction of the illumination light sources included in the illumination 30 from the processor 11. The illumination interface 15 includes a wireless communication unit for transmitting illumination control data through wireless communication such as a wireless LAN or Bluetooth. With the illumination interface 15, the photographing control device 10 can remotely control a lighting state of the illumination 30.

The camera interface 16 is an interface for the processor 11 to exchange data between the processor 11 and the camera 40. The camera interface 16 includes a wireless communication unit for transmitting and receiving data through wireless communication such as a wireless LAN or Bluetooth. With the camera interface 16, the photographing control device 10 can remotely control the camera 40. The data transmitted from the processor 11 to the camera 40 can include, for example, photographing instruction data for causing the camera 40 to perform photographing (e.g., perform photography, capture one or more images, etc.). The data received by the processor 11 from the camera 40 can include, for example, photographed image data photographed by the camera 40. The photographed image data can be stored in the storage 13.

The instruction interface 17 is an interface for the processor 11 to receive instruction data from the touch panel 50 (e.g., a user interface). The instruction data can include, for example, an operation start instruction for the photographing apparatus 1, a selection instruction for photographed image data photographed by the camera 40, and an output of the selected photographed image data to the image recognition device 60.

The transmission interface 18 is an interface for the processor 11 to transmit the photographed image data stored in the storage 13 to the image recognition device 60. The transmission interface 18 includes a wireless communication unit for transmitting the photographed image data through wireless communication such as a wireless LAN or Bluetooth. With the transmission interface 18, the photographing control device 10 can cause the image recognition device 60 to recognize, from the photographed image data, information concerning a photographing target such as price tag information printed on a price tag.

Figure 2:
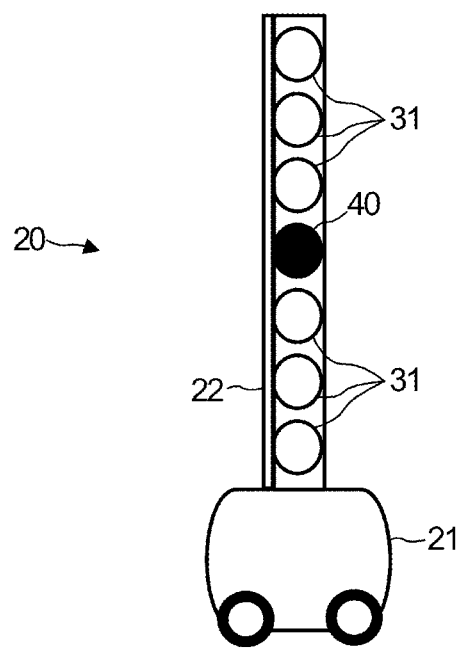
FIG. 2 is a schematic diagram illustrating an attachment state of illumination light sources and a camera to a traveling robot.
Figure 3:
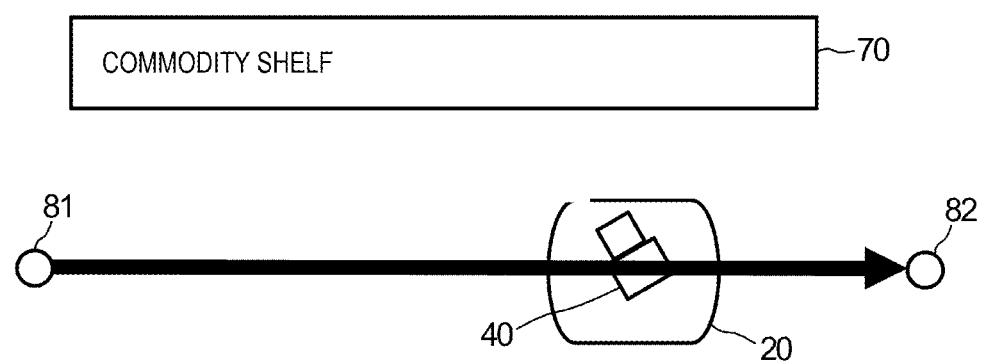
FIG. 3 is a top schematic view of a commodity shelf illustrating a traveling direction of the traveling robot with respect to the commodity shelf.
Figure 4:
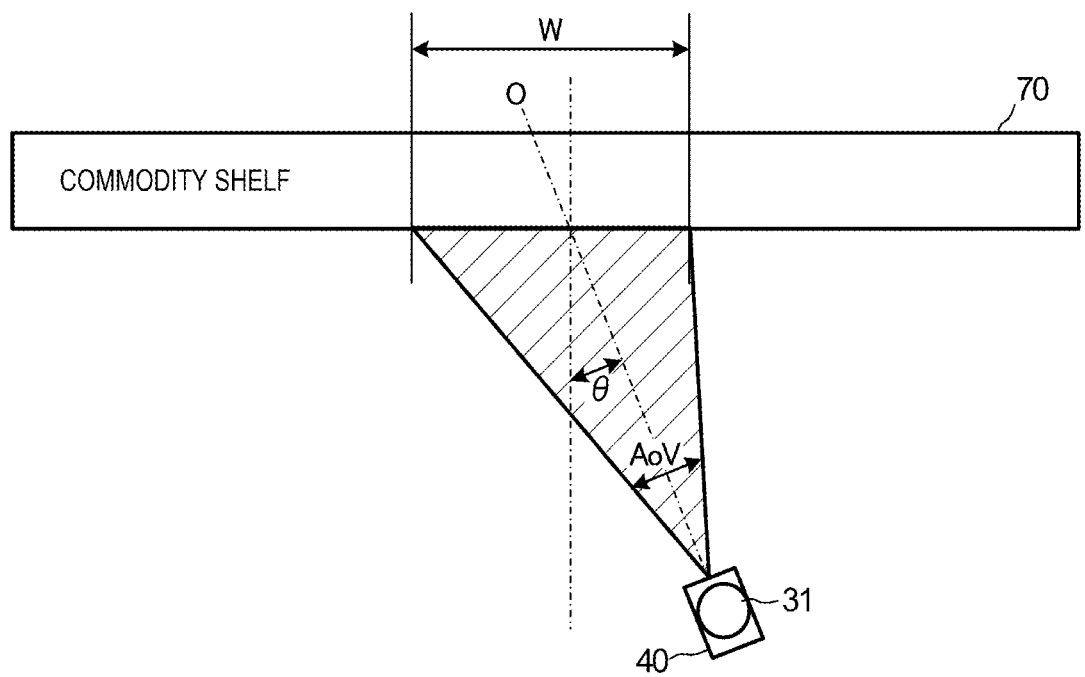
FIG. 4 is a schematic diagram illustrating a photographing range of the camera with respect to the commodity shelf.

In the following explanation, a disposition relation among the traveling robot 20, the illumination light sources included in the illumination 30, and the camera 40 is explained with reference to FIGS. 2 to 4. FIG. 2 is a schematic diagram illustrating an attachment state of the illumination light sources 31 and the camera 40 to the traveling robot 20. FIG. 3 is a top schematic view of a commodity shelf 70 illustrating a traveling direction of the traveling robot 20 with respect to the commodity shelf 70. FIG. 4 is a schematic diagram illustrating a photographing range of the camera 40 with respect to the commodity shelf 70.

The traveling robot 20 includes a robot body 21 (e.g., a carriage, a chassis, a powertrain, etc.) including three or four wheels and an attachment section 22 (e.g., a tower, a frame, a fixture, etc.) extending upward from the robot body 21. The robot body 21 is capable of moving (e.g., under its own power, using one or more electric motors, etc.) in a forwarding direction (e.g., a forward direction) and a retracting direction (e.g., a reverse direction) and turning to the left or the right with two-wheel differential driving. A plurality of illumination light sources 31 and the camera 40 are attached to the attachment section 22. The illumination light sources 31 and the camera 40 are linearly disposed along the height direction. The attachment section 22 holds the camera 40 to face a direction deviating from the normal direction of the side surface of the robot body 21.

Specifically, the traveling robot 20 travels substantially in parallel to the commodity shelf 70 from a traveling start point 81 to a stop point 82 (e.g., in a travel direction). This direction hereinafter referred to as first direction. Consequently, the traveling robot 20 functions as a moving mechanism that moves in the first direction.

Although not particularly illustrated, the commodity shelf 70 includes display shelves in a plurality of stages. In display shelves in the stages, the same commodities are arrayed and displayed in the depth direction of the display shelves (the up-down direction of FIG. 3). In the shelves in the stages, different commodities are arranged side by side and displayed in the first direction, which is the left-right direction of the display shelves. In the display shelves, price tags on which price tag information indicating prices of the commodities are presented in association with the commodities. Since the commodity shelf 70 includes the display shelves in the plurality of stages, the commodity shelf 70 has height. The attachment section 22 of the traveling robot 20 holds the camera 40 at an attachment angle at which the camera 40 can photograph the price tags presented in the display shelves in the plurality of stages of the commodity shelf 70. The distance between the camera 40 and a price tag presentation surface of the commodity shelf 70 in a second direction orthogonal to the first direction and the height direction, that is, the normal direction of the side surface of the robot body 21 is specified such that the camera 40 is capable of performing such photographing. That is, the distance between the camera 40 and the commodity shelf 70 is specified according to an angle of view in the height direction determined by the attachment angle of the camera 40. In this way, a distance from the commodity shelf 70 that the traveling robot 20 travels is determined. The attachment section 22 of the traveling robot 20 holds the plurality of illumination light sources 31 side by side in the height direction across the camera 40 such that a plurality of price tags distributed and arranged in the height direction are photographed by the camera 40.

The attachment section 22 of the traveling robot 20 holds the camera 40 at an attachment angle at which the camera 40 faces a third direction (e.g., a camera direction) rotated about an axis extending along the height direction (e.g., a vertical axis, a height axis, etc.) with respect to the second direction and performs photographing. That is, the attachment section 22 holds the camera 40 such that a photographing optical axis O of the camera 40 faces the third direction rotated by an angle θ with respect to the second direction. A photographing width W of the commodity shelf 70 photographed by the camera 40 at this time is determined according to the rotation angle θ in a yaw direction of the camera 40 and the distance between the camera 40 and the commodity shelf 70. The attachment section 22 holds the camera 40 such that the rotation angle θ in the yaw direction of the camera 40 has an angle equal to or larger than a half of an angle of view AoV in the first direction of the camera 40. If the yaw direction rotation angle θ is smaller than the half of the angle of view AoV, reflected light of light of the illumination light sources 31 reflected by a price tag is reflected in the photographed image data of the camera 40.

Figure 5:
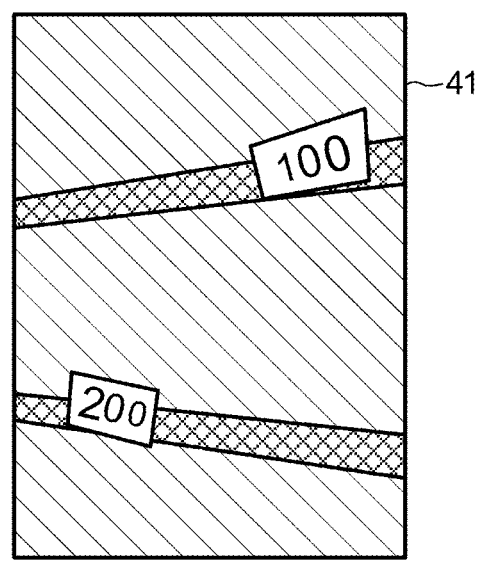
FIG. 5 is a schematic diagram illustrating an example of photographed image data before correction photographed by the camera.
Figure 6:
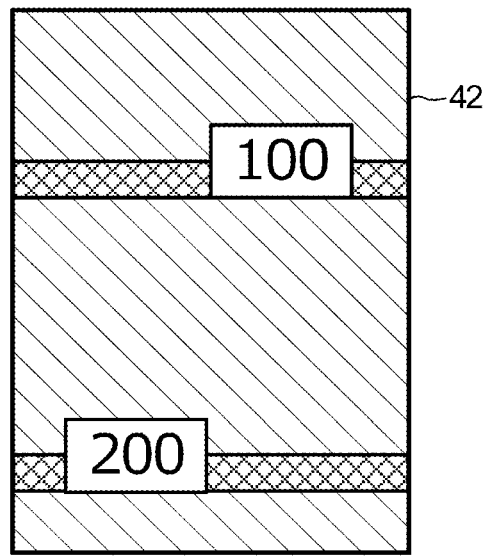
FIG. 6 is a schematic diagram illustrating an example of photographed image data after the correction.
Figure 7:
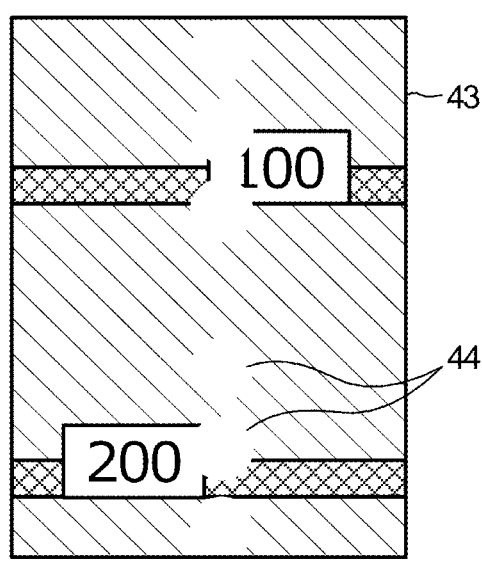
FIG. 7 is a schematic diagram illustrating photographed image data of a comparative example.

FIG. 5 is a schematic diagram illustrating an example of photographed image data before correction photographed by the camera 40. FIG. 6 is a schematic diagram illustrating an example of photographed image data after correction photographed by the camera 40. FIG. 7 is a schematic diagram illustrating photographed image data in a comparative example.

If the camera 40 is attached to the attachment section 22 of the traveling robot 20 at the rotation angle θ in the yaw direction of the camera 40 as explained above, such that the camera 40 is not oriented at a right angle (i.e., right opposed) to the price tag presentation surface of the commodity shelf 70, the photographed image data 41 of the camera 40 experiences trapezoidal distortion as shown in FIG. 5. The processor 11 of the photographing control device 10 applies trapezoidal distortion correction processing to the photographed image data 41 according to an application program stored in the memory 12. Consequently, the processor 11 can correct the photographed image data 41 having the distortion illustrated in FIG. 5 to photographed image data 42 not having trapezoidal distortion as illustrated in FIG. 6. That is, the processor 11 can obtain the photographed image data 42 corresponding to photographed image data obtained if the camera 40 is arranged at a right angle to the price tag presentation surface of the commodity shelf 70 to perform photographing, that is, equivalent to such photographed image data. If the camera 40 were arranged right opposed to the price tag presentation surface of the commodity shelf 70 to perform photographing, as illustrated in FIG. 7, the illumination light sources 31 are reflected in obtained photographed image data 43 and white voids 44 occurs. On the other hand, as illustrated in FIG. 6, the photographed image data 42 after the correction is an image without such white voids.

Figure 8:
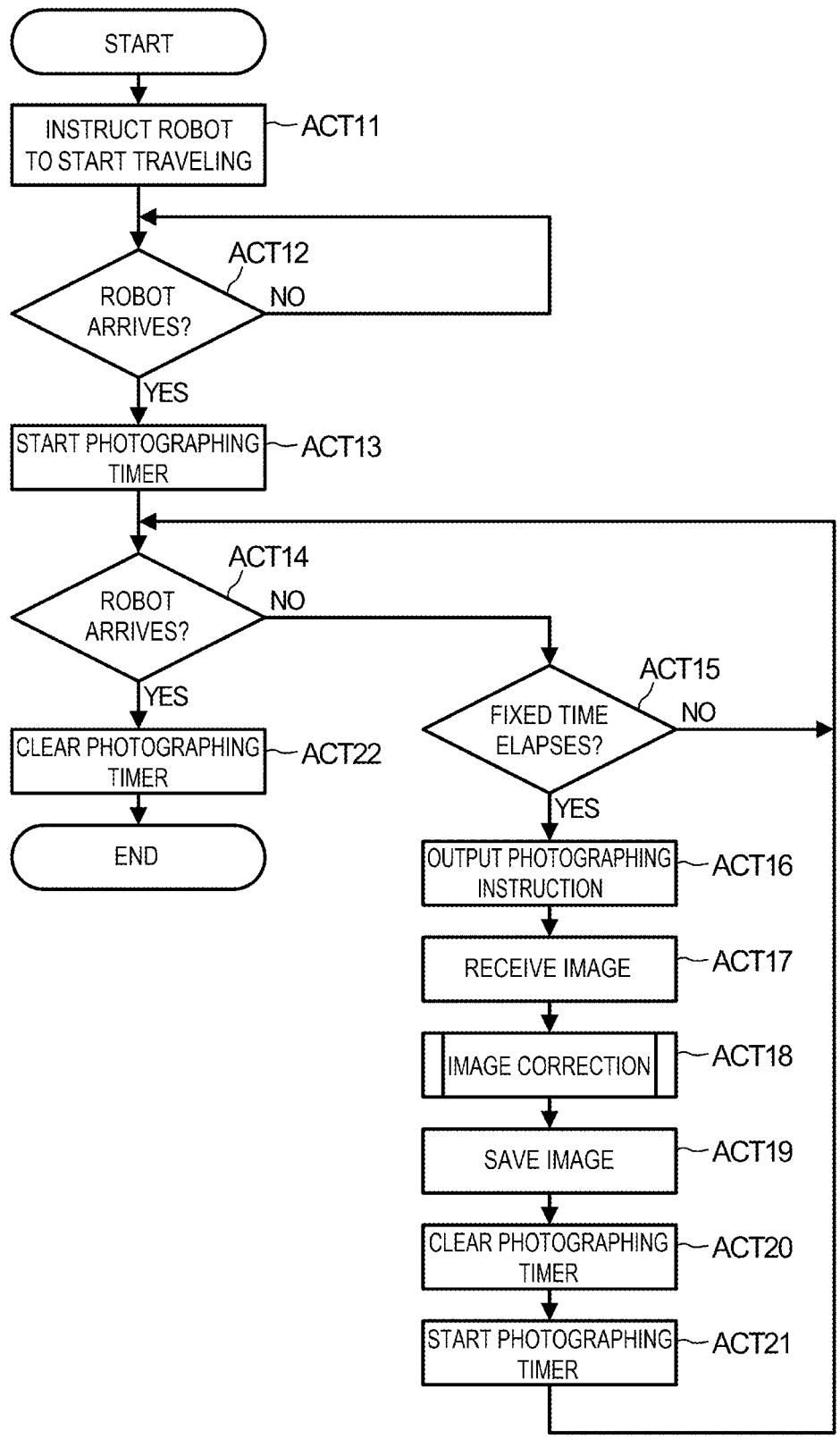
FIG. 8 is a flowchart illustrating a main control procedure of a processor of a photographing control device.

FIG. 8 is a flowchart illustrating a main control procedure of the processor 11 of the photographing control device 10. In the following explanation, the operation of the photographing control device 10 is explained with reference to FIG. 8. A procedure and content of the operation explained below are an example. The procedure and the content are not limited if the same result is obtained.

If receiving, for example, a photographing start instruction for the photographing apparatus 1 from the touch panel 50 via the instruction interface 17, the processor 11 starts the operation illustrated in FIG. 8. First, the processor 11 transmits, with the robot interface 14, traveling instruction data for instructing the traveling robot 20 to start traveling (ACT 11).

The traveling instruction data transmitted from the photographing control device 10 to the traveling robot 20 may be data for designating the traveling start point 81. The traveling robot 20 stores a traveling route indicating where in the store the traveling robot 20 travels. That is, since the traveling robot 20 stores the stop point 82 corresponding to the designated traveling start point 81, the stop point 82 does not have to be designated. Naturally, the traveling instruction data may include data for designating the stop point 82 of the traveling. The traveling start point 81 (and the stop point 82) to be designated is the traveling start point 81 (and the stop point 82) of any one traveling route among a plurality of traveling routes for going around all stores to which the traveling robot 20 should travel. Naturally, the traveling instruction data may be the traveling start point 81 of a first traveling route (and the stop point 82 of a last traveling route) of all the traveling routes.

The processor 11 determines whether the traveling robot 20 reaches the traveling start point 81 (ACT 12). The traveling robot 20 autonomously travels from a standby position to the traveling start point 81. If reaching the traveling start point 81, the traveling robot 20 transmits, to the photographing control device 10, state data including arrival data indicating that the traveling robot 20 reaches the traveling start point 81. Therefore, the processor 11 can determine, according to whether the arrival data is received via the robot interface 14, whether the traveling robot 20 reaches the traveling start point 81. If the traveling robot 20 does not reach the traveling start point 81 yet (NO in ACT 12), the processor 11 repeats the processing in ACT 12. In this way, the processor 11 waits for the traveling robot 20 to reach the traveling start point 81.

In some cases, the traveling start point 81 of the instructed one traveling route is the standby position of the traveling robot 20 or is the same point as the stop point 82 of the immediately preceding traveling route. In such a case, the processor 11 immediately determines that the traveling robot 20 reaches the traveling start point 81.

If the traveling robot 20 reaches the traveling start point 81 in this way (YES in ACT 12), the processor 11 starts clocking (e.g., begins timing, begins recording the passage of time) with a photographing timer provided in the memory 12 (ACT 13).

The processor 11 determines whether the traveling robot 20 reaches the stop point 82 (ACT 14). The traveling robot 20 autonomously travels at constant speed from the traveling start point 81 to the stop point 82. Upon reaching the stop point 82, the traveling robot 20 transmits, to the photographing control device 10, state data including arrival data indicating that the traveling robot 20 has reached the stop point 82. Therefore, the processor 11 can determine, according to whether the arrival data is received via the robot interface 14, whether the traveling robot 20 has reached the stop point 82.

If the traveling robot 20 has not yet reached the stop point 82 (NO in ACT 14), the processor 11 determines whether a fixed time has elapsed from a clocking start of the photographing timer (ACT 15). If the fixed time has not yet elapsed (NO in ACT 15), the processor 11 returns to the processing in ACT 14.

If the fixed time has elapsed (YES in ACT 15), the processor 11 outputs a photographing instruction (ACT 16). The photographing instruction includes photographing instruction data for the camera 40 and illumination control data for the illumination 30. The processor 11 transmits, with the camera interface 16, photographing instruction data for causing the camera 40 to perform photographing to the camera 40. The processor 11 transmits, with the illumination interface 15, illumination control data for instructing lighting of the plurality of illumination light sources 31 included in the illumination 30 to the illumination 30.

The processor 11 receives, with the camera interface 16, photographed image data photographed by the camera 40 and temporarily stores the photographed image data in the memory 12 (ACT 17).

Figure 9:
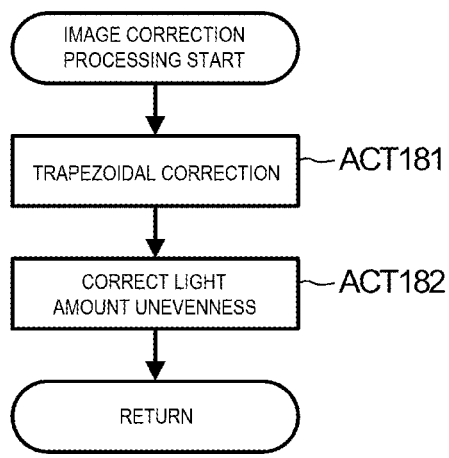
FIG. 9 is a flowchart illustrating a control procedure of image correction processing in FIG. 8.

The processor 11 applies image correction processing to the photographed image data temporarily stored in the memory 12 (ACT 18). FIG. 9 is a flowchart illustrating a control procedure of the image correction processing. In the image correction processing, first, the processor 11 applies trapezoidal distortion correction processing to the photographed image data (ACT 181). Consequently, the processor 11 functions as a correcting unit that corrects distortion of the photographed image data photographed by the camera 40 and acquires or generates photographed image data equivalent to a case in which the camera 40 faces the second direction and performs photographing. Thereafter, the processor 11 applies light amount unevenness correction processing to the photographed image data after the trapezoidal distortion correction processing (ACT 182). The processor 11 ends the image correction processing and returns to the processing in FIG. 8. The trapezoidal distortion correction processing and the light amount unevenness correction processing are well-known correction processing. Therefore, explanation thereof is omitted.

If the image correction processing is applied to the photographed image data in this way, the processor 11 saves, in the storage 13, the photographed image data to which the image correction processing is applied (ACT 19).

Thereafter, the processor 11 once clears the photographing timer (ACT 20). The processor 11 starts clocking with the photographing timer anew (ACT 21). Thereafter, the processor 11 returns to the processing in ACT 14.

In this way, while the traveling robot 20 autonomously travels along the traveling route at the constant speed, the commodity shelf 70 including the price tag illuminated by the illumination light sources 31 is photographed by the camera 40 at an interval of the fixed time (e.g., a predetermined time interval). The traveling robot 20 travels at the constant speed. Therefore, the camera 40 performs the photographing at every fixed distance. The processor 11 saves a plurality of photographed image data photographed at every fixed distance in the storage 13 after performing image correction.

If the photographing is performed by the camera 40 in this way and the traveling robot 20 reaches the stop point 82 (YES in ACT 14), the processor 11 clears the photographing timer (ACT 22). The operation illustrated in FIG. 8 is ended.

Thereafter, by receiving the photographing start instruction for the photographing apparatus 1, the processor 11 can perform photographing for the next traveling route.

The processor 11 can receive, with the touch panel 50, via the instruction interface 17, a selection instruction for photographed image data saved in the storage 13 and an output of the photographed image data to the image recognition device 60. In this case, the processor 11 transmits the selected photographed image data to the image recognition device 60 with the transmission interface 18. The image recognition device 60 can recognize, from the transmitted photographed image data, information concerning a photographing target such as price tag information printed on a price tag.

In the photographed image data photographed at the interval of the fixed time, in some case, a price tag portion is included in an end position of an image and the entire price tag is not photographed. Accordingly, an interval for photographing the photographed image data is set to an interval for photographing images such that an overlapping portion is included in continuous two photographed image data. The processor 11 may transmit the continuous two photographed image data to the image recognition device 60 after combining the continuous two photographed image data into one photographed image data with well-known image matching processing.

[Modification 1]

Figure 10:
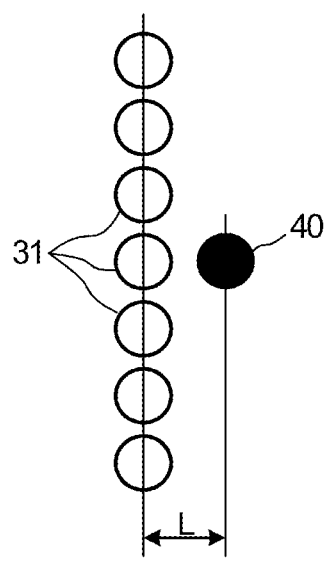
FIG. 10 is a schematic diagram illustrating a disposition example of the camera and the illumination light sources in a first modification of the first embodiment.
Figure 11:
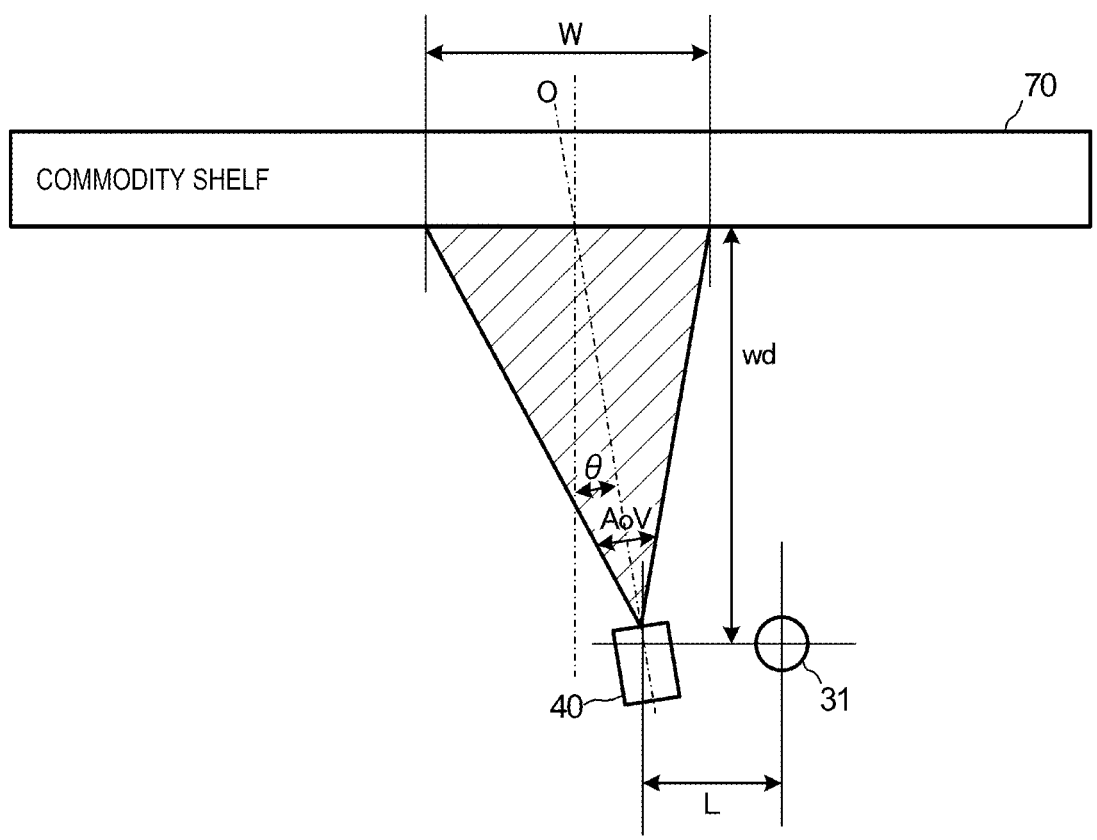
FIG. 11 is a schematic diagram illustrating a photographing range of the camera with respect to the commodity shelf in the first modification.

In the first embodiment, the camera 40 and the illumination light sources 31 are linearly disposed along the height direction as illustrated in FIG. 2. However, the camera 40 and the illumination light sources 31 may be substantially linearly disposed. FIG. 10 is a schematic diagram illustrating a disposition example of the camera 40 and the illumination light sources 31 in the first modification. FIG. 11 is a schematic diagram illustrating a photographing range of the camera 40 with respect to the commodity shelf 70 in the first modification.

As illustrated in FIG. 10, the camera 40 and the illumination light sources 31 may be apart (e.g., offset from one another) by a distance L in the first direction. The distance L is sufficiently small compared with the photographing width W of the camera 40. Specifically, the distance L in the first direction is determined as follows:

$$L \leq 2 \times a \, \tan(AoV/2 - \theta) \times wd$$

where, as illustrated in FIG. 11, AoV represents the photographing angle of the camera 40, wd represents a distance in the second direction between the camera 40 and the price tag presentation surface of the commodity shelf 70, which is the photographing target object on the photographing optical axis O of the camera 40, and θ represents a rotation angle in the yaw direction of the camera 40 in a third direction. If the camera 40 and the illumination light sources 31 are disposed at such a distance L, as in the first embodiment, it is possible to prevent the illumination light sources 31 from being reflected in the photographed image data.

The illumination light sources 31 need to face, in the first direction, the opposite side of a side that the camera 40 faces. If the illumination light sources 31 are disposed on the same side as the side that the camera 40 faces, the illumination light sources 31 are reflected in the photographed image data.

If the camera 40 is arranged right opposed to a price tag of the commodity shelf 70 to perform photographing, the illumination light sources 31 are reflected in photographed image data photographed by the camera 40 unless the illumination light sources 31 are disposed in a place further part from the camera 40 than the photographing width W. If the camera 40 and the illumination light sources 31 are separated by a distance larger than the photographing width W in this way, the entire apparatus is increased in size.

On the other hand, in the first modification, the illumination light sources 31 only have to be separated from the camera 40 by the distance L sufficiently smaller than the photographing width W. Therefore, a reduction in the size of the apparatus can be achieved.

The distance L is specified from the photographing angle of view AoV, the distance wd in the second direction, and the yaw direction rotation angle θ. The camera 40 and the illumination light sources 31 are disposed at such a distance L. However, substantially linear disposition at any distance L of the camera 40 and the illumination light sources 31 may be determined first. In such a case, all that has to be done is to determine the rotation angle θ in the yaw direction based on the above expression and attach the camera 40 to the traveling robot 20 to form the rotation angle θ. Alternatively, the distance wd in the second direction may be adjusted.

[Modification 2]

Figure 12:
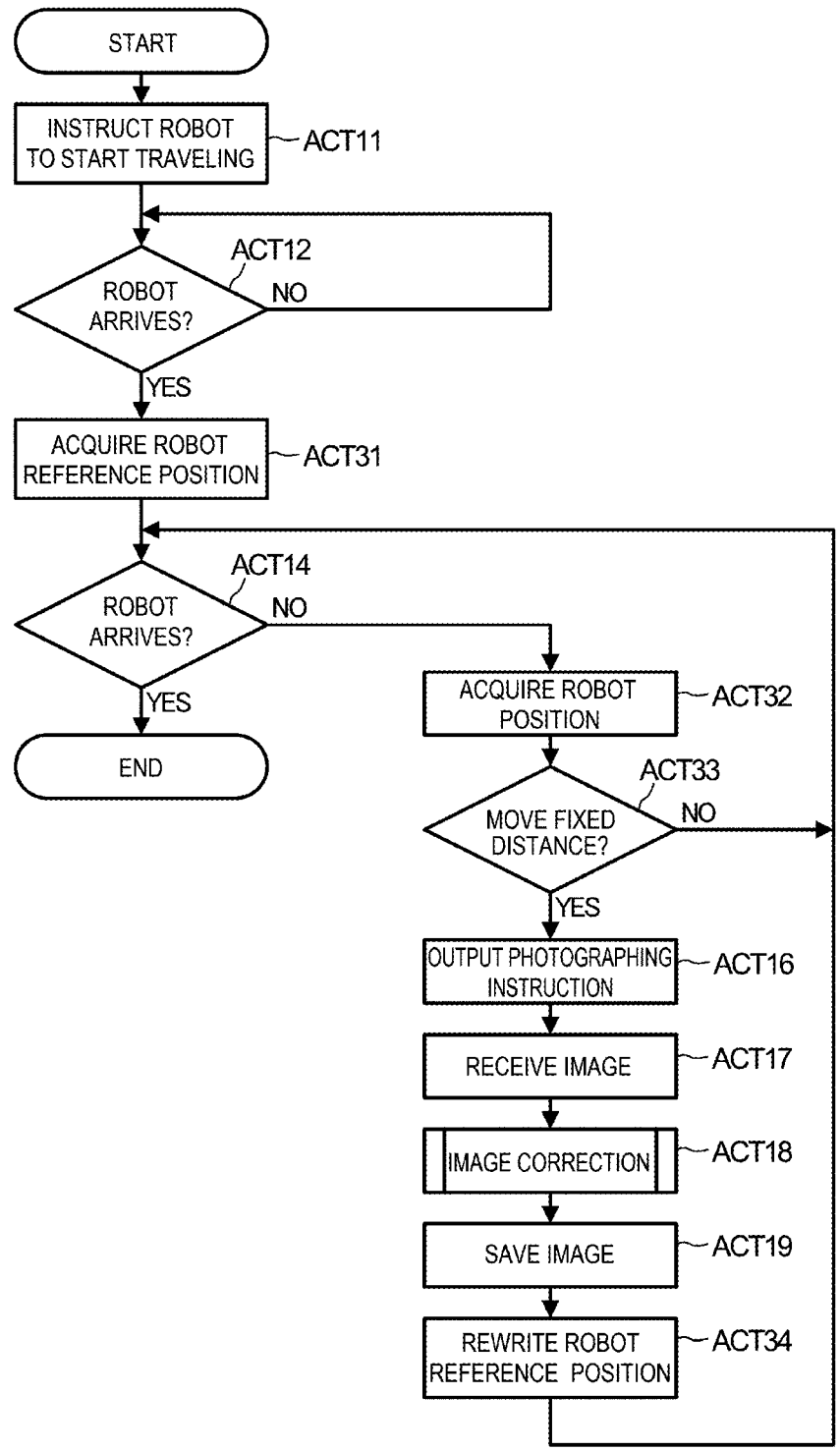
FIG. 12 is a flowchart illustrating a main control procedure of the processor of the photographing control device in a second modification of the first embodiment.

FIG. 12 is a flowchart illustrating a main control procedure of the processor 11 of the photographing control device 10 in a second modification of the first embodiment. The operation of the photographing control device 10 is explained with reference to FIG. 12. A procedure and content of the operation explained below are an example. The procedure and the content are not limited if the same result is obtained.

The same processing as the processing in the first embodiment is denoted by the same reference signs as the reference signs in FIG. 8 to omit explanation of the processing. In the second modification, if the traveling robot 20 reaches the traveling start point 81 (YES in ACT 12), the processor 11 acquires a reference position of the traveling robot 20 (ACT 31). The processor 11 stores the acquired reference position in the memory 12. The reference position is the position of the traveling start point 81, for example, a XY coordinate in a map describing the disposition of the commodity shelf 70 and a traveling route of the traveling robot 20 inside the store.

As in the first embodiment, in ACT 14, the processor 11 determines whether the traveling robot 20 has reached the stop point 82. If the traveling robot 20 has not yet reached the stop point 82 (NO in ACT 14), in the second modification, the processor 11 acquires the position of the traveling robot 20 (ACT 32). In order to autonomously travel, the traveling robot 20 always measures the position of the traveling robot 20 itself. Therefore, the processor 11 can acquire the position by causing the traveling robot 20 to output the position and receiving the position with the robot interface 14. Naturally, the processor 11 may acquire the position of the traveling robot 20 by other means such as using a beacon.

The processor 11 calculates a difference between the acquired position of the traveling robot 20 and the reference position stored in the memory 12 and determines whether the traveling robot 20 has moved a fixed distance (ACT 33) (e.g., a predetermined distance). If the traveling robot 20 has not yet moved the fixed distance (NO in ACT 33), the processor 11 returns to the processing in ACT 14.

If the traveling robot 20 has moved the fixed distance (YES in ACT 33), the processor 11 proceeds to ACT 16 and outputs a photographing instruction. Thereafter, the processor 11 executes the processing in ACT 17 to ACT 19 explained in the first embodiment. The processor 11 rewrites the reference position of the traveling robot 20 stored in the memory 12 to the position acquired in ACT 32 (ACT 33). Thereafter, the processor 11 returns to the processing in ACT 14.

In this way, while the traveling robot 20 autonomously travels in the traveling route at the constant speed, every time the traveling robot 20 travels the fixed distance, the commodity shelf 70 including the price tag illuminated by the illumination light sources 31 is photographed by the camera 40. By acquiring the photographed image data at every fixed distance in this way, it is possible to perform combination processing for continuous two photographed image data without performing the image matching processing and the like. Although the traveling robot 20 travel at the constant speed, if some obstacle is present, the traveling robot 20 sometimes stops in the position of the obstacle. If the obstacle disappears, the traveling robot 20 starts traveling again. In such a case, it is desirable to perform the photographing at every fixed distance rather than the photographing in every fixed time in the first embodiment.

If the photographing is performed by the camera 40 in this way and the traveling robot 20 reaches the stop point 82 (YES in ACT 14), the processor 11 clears the photographing timer (ACT 22). The processor 11 ends the operation illustrated in FIG. 8.

The photographing apparatus 1 according to the first embodiment or the modifications explained above includes the traveling robot 20, which is the moving mechanism that moves in the first direction, the illumination light sources 31 mounted on the traveling robot 20, and the camera 40 disposed linearly or substantially linearly to the illumination light sources 31 along the height direction and attached to the traveling robot 20 to face the third direction rotated with the height direction as the axis with respect to the second direction orthogonal to the first direction and the height direction and perform photographing.

In this way, the camera 40 faces the third direction and performs photographing according to the movement of the traveling robot 20. Consequently, it is possible to prevent the illumination light sources 31 from being reflected in the photographed image data.

The processor 11 corrects distortion of an image photographed by the camera 40 and acquires photographed image data equivalent to a case in which the camera 40 faces the second direction and performs photographing.

Consequently, even if the camera 40 faces the third direction and performs photographing, it is possible to acquire the same photographed image data as photographed image data in the case in which the camera 40 faces the second direction and performs photographing.

[Second Embodiment]

Figure 13:
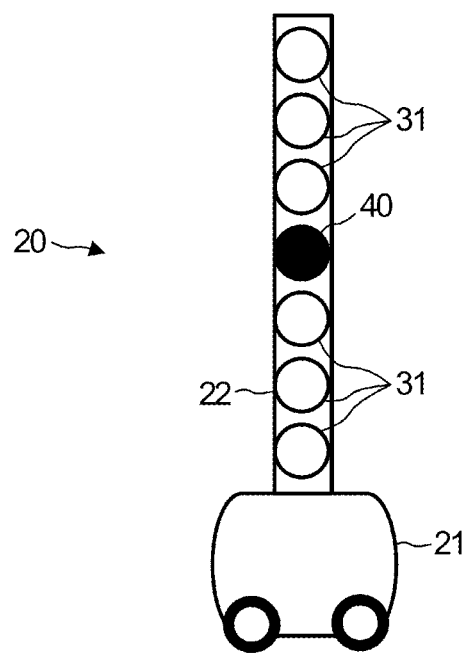
FIG. 13 is a schematic diagram illustrating an attachment state of a camera and a light source to a traveling robot in a photographing apparatus in a second embodiment.
Figure 14:
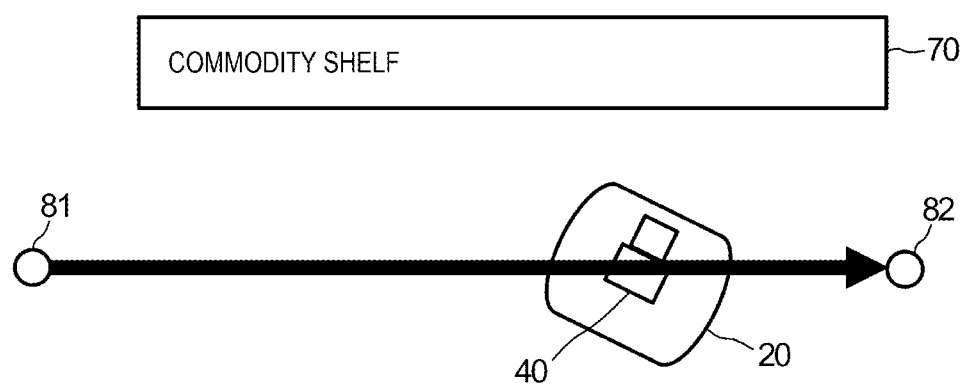
FIG. 14 is a schematic top view of a commodity shelf illustrating a traveling direction of the traveling robot with respect to the commodity shelf in the second embodiment.

FIG. 13 is a schematic diagram illustrating an attachment state of the camera 40 and the illumination light sources 31 to the traveling robot 20 in the photographing apparatus 1 in a second embodiment. FIG. 14 is a top plan view of the commodity shelf 70 illustrating a traveling direction of the traveling robot 20 with respect to the commodity shelf 70 in the second embodiment.

In the first embodiment and the modifications of the first embodiment, the camera 40 is attached to the traveling robot 20 at the rotation angle θ in the yaw direction with respect to the traveling robot 20. On the other hand, in the second embodiment, the camera 40 is attached to the traveling robot 20 to face the normal direction of the side surface of the robot body 21. That is, the attachment section 22 of the traveling robot 20 disposes the camera 40 linearly to the illumination light sources 31 along the height direction and holds the camera 40 to face the second direction orthogonal to the first direction and the height direction, such that the camera 40 faces in the second direction when (a) the traveling robot 20 moves in the first direction parallel to the commodity shelf 70 and (b) the robot body 21 is in a first orientation relative to the first direction.

In this case, as the traveling robot 20, a traveling robot that can move straight forward in the first direction parallel to the commodity shelf 70 while maintaining an orientation in which the robot body 21 is rotated in the yaw direction as illustrated in FIG. 14 (i.e., while the robot body 21 is in a second orientation relative to the first direction). In such a traveling robot 20 that can move straight forward, for example, omni wheels or mecanum wheels are used. The omni wheels or the mecanum wheels are wheels that do not turn using steering like a general tire but turn using a rotation difference of driving wheels. The omni wheels or the mecanum wheels control a rotation difference of wheels to enable not only movement of the wheels in a rotating direction like a normal tire but also turning and parallel movement in all directions. In the traveling robot 20 in which the omni wheels or the mecanum wheels are used, a moving mechanism is simplified and a reduction in size and a reduction in weight can be expected compared with a tire in which steering or a crawler is used.

Figure 15:
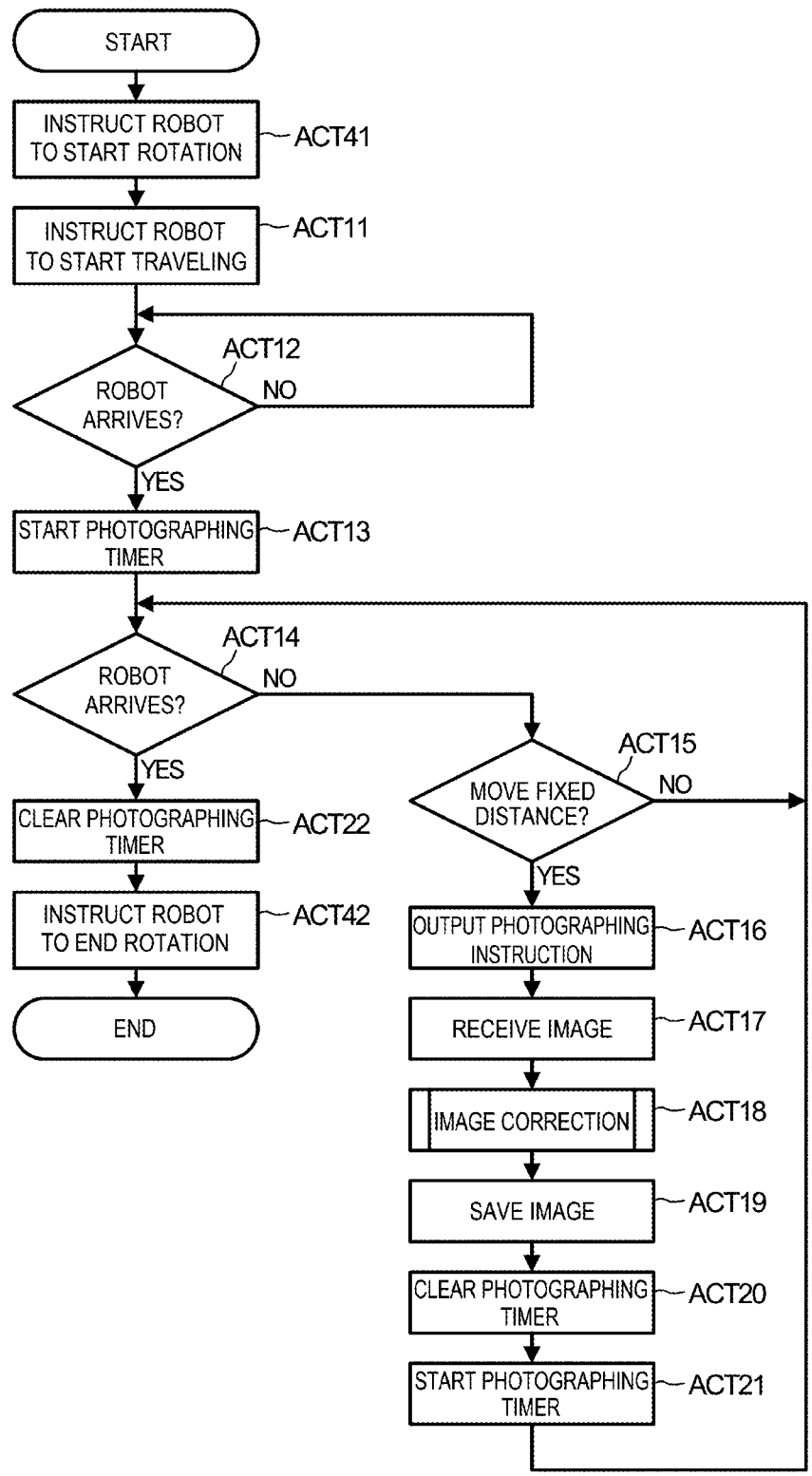
FIG. 15 is a flowchart illustrating a main control procedure of a processor of a photographing control device.

FIG. 15 is a flowchart illustrating a main control procedure of the processor 11 of the photographing control device 10 in the second embodiment. In the following explanation, the operation of the photographing control device 10 is explained with reference to FIG. 15. A procedure and content of the operation explained below are an example. The procedure and the content are not limited if the same result is obtained.

The same processing as the processing in the first embodiment is denoted by the same reference signs as the reference signs in FIG. 8 to omit explanation of the processing. In the second embodiment, first, the processor 11 transmits, with the robot interface 14, robot rotation start instruction data to the traveling robot 20 (ACT 41). The robot rotation start instruction data instructs the traveling robot 20 to rotate at the rotation angle θ in the yaw direction (e.g., from the first orientation in which the camera 40 faces the second direction to the second orientation in which the camera 40 faces the third direction).

Thereafter, as in the first embodiment, the processor 11 executes the processing in ACT 11 to ACT 21 and acquires photographed image data with the camera 40 in every fixed time.

If the traveling robot 20 reaches the stop point 82 (YES in ACT 14), the processor 11 proceeds to ACT 22 and clears the photographing timer. Thereafter, the processor 11 transmits, with the robot interface 14, robot rotation end instruction data to the traveling robot 20 (ACT 42). The robot rotation end instruction data instructs the traveling robot 20 to end the rotation at the rotation angle θ in the yaw direction (e.g., such that the robot body 21 returns to the first orientation). The processor 11 ends the operation illustrated in FIG. 15.

As explained above, the photographing apparatus 1 having the configuration according to the second embodiment includes the traveling robot 20, which is the moving mechanism that moves in the first direction, the illumination light sources 31 mounted on the traveling robot 20, and the camera 40 disposed linearly to the illumination light sources 31 along the height direction and attached to the traveling robot 20 to face the second direction orthogonal to the first direction and the height direction. The traveling robot 20 moves in the first direction in a state in which the traveling robot 20 is rotated such that the camera 40 faces the third direction rotated with the height direction as the axis with respect to the second direction and performs photographing.

Even with such a configuration, the camera 40 faces the third direction and performs photographing according to the movement of the traveling robot 20. Consequently, it is possible to prevent the illumination light sources 31 from being reflected in the photographed image data.

In the second embodiment, it goes without saying that modifications same as the first modification and the second modification of the first embodiment can be performed.

The embodiments of the photographing apparatus 1 and the photographing method with which the illumination light sources are not reflected in the photographed image data are explained above. However, such embodiments are not limited to this.

For example, the photographing target photographed by the camera 40 may be a commodity itself rather than the price tag. The camera 40 faces the third direction and photographs the commodity illuminated by the illumination light sources 31. Consequently, it is possible to acquire photographed image data in which texture of the commodity is more easily discriminated.

The photographing control device 10 and the image recognition device 60 may be incorporated in the robot body 21 of the traveling robot 20. Consequently, the wireless communication unit can be omitted. The photographing apparatus can be inexpensively configured.

Besides, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A photographing apparatus comprising:
    a carriage configured to move in a travel direction;
    a light source mounted on the carriage; and
    a camera attached to the carriage and configured to perform photography while facing a camera direction, the camera having an angle of view, wherein:
        a normal direction is defined orthogonal to the travel direction and a vertical axis; and
        the camera direction is rotated about the vertical axis with respect to the normal direction by an attachment angle and rotated about the vertical axis with respect to the travel direction, the attachment angle being greater than or equal to half of the angle of view.

2. The photographing apparatus of claim 1, wherein the light source and the camera are aligned with one another along a height direction.

3. The photographing apparatus of claim 2, wherein the light source and the camera are aligned with the vertical axis, and the light source is offset from the camera along the vertical axis.

4. The photographing apparatus of claim 3, wherein the light source is a first light source, further comprising a second light source substantially aligned with the vertical axis and offset from the first light source along the vertical axis.

5. The photographing apparatus of claim 1, wherein the camera and the light source are offset from one another in the travel direction.

6. The photographing apparatus of claim 1, wherein the normal direction is orthogonal to a side surface of a body of the carriage.

7. The photographing apparatus of claim 1, further comprising a controller configured to (a) correct distortion of an image photographed by the camera and (b) generate a photographed image equivalent to a case in which the camera faces the normal direction and performs the photography.

8. The photographing apparatus of claim 1, further comprising a controller configured to:
    control the camera to capture a plurality of images; and
    control the carriage to travel at a constant speed throughout a period of time during which the plurality of images are captured.

9. The photographing apparatus of claim 1, further comprising a controller configured to:
    control the camera to capture a first image; and
    control the camera to capture a second image in response to an indication that the carriage had traveled a predetermined distance since the first image was captured.

10. A photographing apparatus comprising:
    a carriage repositionable between a first orientation and a second orientation and configured to move in a travel direction while in the first orientation and while in the second orientation;
    a light source mounted on the carriage; and
    a camera attached to the carriage and having a fixed orientation relative to the carriage, wherein:
        the camera faces a normal direction orthogonal to the travel direction and a vertical axis while the carriage is in the first orientation;
        when the carriage is in the second orientation, the camera faces a camera direction rotated about the vertical axis with respect to the normal direction; and
        the camera performs photography while the carriage is in the second orientation.

11. The photographing apparatus of claim 10, wherein the light source and the camera are aligned with one another along a height direction.

12. The photographing apparatus of claim 10, wherein the camera is offset from the light source in the travel direction.

13. The photographing apparatus of claim 10, further comprising a controller configured to (a) correct distortion of an image photographed by the camera and (b) generate a photographed image equivalent to a case in which the camera faces the normal direction when performing the photography.

14. A photographing method comprising:
    moving, in a travel direction, a carriage while maintaining a predetermined distance between the carriage and one or more photographing target objects arranged side by side along the travel direction, wherein:
        a light source and a camera are attached to the carriage;
        a normal direction is defined orthogonal to the travel direction and a vertical axis; and
        the camera (a) faces a camera direction rotated about the vertical axis with respect to the normal direction and (b) performs photography; and
    correcting distortion of an image photographed by the camera and generating a photographed image equivalent to a case in which the camera faces the normal direction when performing the photography.

15. The photographing method of claim 14, wherein the light source and the camera are aligned with one another along a height direction.

16. The photographing method of claim 14, wherein the camera and the light source are offset from one another in the travel direction.

17. A photographing method comprising:
    moving a carriage in a travel direction while the carriage is in a first orientation;
    moving the carriage in the travel direction while both (a) the carriage is in a second orientation and (b) maintaining a predetermined distance to one or more photographing target objects arranged side by side along the travel direction, wherein:
        a light source and a camera are attached to the carriage;
        the camera faces a camera direction orthogonal to the travel direction and a vertical axis when the carriage is in the first orientation;
        when the carriage is in the second orientation, the camera faces a camera direction rotated about the vertical axis with respect to the normal direction; and the camera performs photography while the carriage is in the second orientation; and correcting distortion of an image photographed by the camera and generating a photographed image equivalent to a case in which the camera faces the normal direction while performing the photography.

18. The photographing method of claim 17, wherein the light source and the camera are aligned with one another along a height direction.

19. The photographing method of claim 17, wherein the camera and the light source are offset from one another in the travel direction.

* * * * *